(12) United States Patent
Drewnowski et al.

(10) Patent No.: US 7,959,883 B2
(45) Date of Patent: Jun. 14, 2011

(54) ENGINE EXHAUST GAS REACTORS AND METHODS

(75) Inventors: Christopher W Drewnowski, Corning, NY (US); Martin Andrew Sala, Campbell, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/549,630

(22) Filed: Aug. 28, 2009

(65) Prior Publication Data

US 2011/0052464 A1 Mar. 3, 2011

(51) Int. Cl.
- *B01D 53/74* (2006.01)
- *B01D 53/94* (2006.01)
- *B01D 46/00* (2006.01)
- *F01N 3/01* (2006.01)

(52) U.S. Cl. .......... 423/212; 423/213.2; 423/239.1; 423/245.3; 423/215.5; 422/168; 422/177; 422/186.04; 60/275; 60/299; 96/52

(58) Field of Classification Search .......... 423/212, 423/213.2, 239.1, 245.3, 215.5; 422/168, 422/177, 186.04; 60/275, 299; 96/52
See application file for complete search history.

(56) References Cited

U.S. PATENT DOCUMENTS

| | | |
|---|---|---|
| 4,304,096 A | 12/1981 | Liu |
| 4,380,900 A | 4/1983 | Linder |
| 4,478,613 A | 10/1984 | Brettschneider |
| 4,588,423 A | 5/1986 | Gillingham |
| 4,871,515 A | 10/1989 | Reichle |
| 5,557,923 A | 9/1996 | Bolt |
| 5,950,424 A * | 9/1999 | Nojima ............ 60/275 |
| 6,038,854 A | 3/2000 | Penetrante |
| 7,112,236 B2 * | 9/2006 | Hoverson et al. ......... 95/78 |
| 7,198,762 B1 | 4/2007 | Teboul |
| 7,356,987 B2 | 4/2008 | Kiser |
| 7,361,207 B1 | 4/2008 | Coffey |
| 7,393,385 B1 | 7/2008 | Coffey |
| 2005/0031513 A1 | 2/2005 | McNamara |
| 2007/0000236 A1 * | 1/2007 | Naito et al. ............ 60/275 |
| 2008/0102010 A1 | 5/2008 | Bruck |

FOREIGN PATENT DOCUMENTS

| | | |
|---|---|---|
| EP | 1057519 | 12/2000 |
| EP | 1077078 | 2/2001 |
| FR | 2864143 | 6/2005 |
| FR | 2880062 | 6/2006 |
| GB | 2229117 | 9/1990 |
| GB | 2346821 | 8/2000 |
| WO | 0196717 | 12/2001 |
| WO | 2007082683 | 7/2007 |

* cited by examiner

*Primary Examiner* — Timothy C Vanoy
(74) *Attorney, Agent, or Firm* — Joseph M. Homa

(57) ABSTRACT

Particulate pollutants such as carbonaceous particles are removed from an engine exhaust stream by passing the exhaust stream through an exhaust gas reactor, the exhaust stream first traversing a charging zone wherein the particles are charged via a corona discharge, and thereafter traversing a downstream collection zone wherein the charged particles are collected and eliminated by a collector/reactor having an oppositely charged reactive collecting surface.

17 Claims, 2 Drawing Sheets

US 7,959,883 B2

ENGINE EXHAUST GAS REACTORS AND METHODS

FIELD

The present disclosure relates to engine exhaust gas reactors and methods for the control of harmful gaseous and particulate exhaust emissions from mobile pollution sources such as fossil-fuel burning gasoline and diesel internal combustion engines.

BACKGROUND

A variety of technologies for the capture of particulate emissions from diesel engines are presently available. Diesel engines have long been the engines of choice for powering heavy duty equipment such as trucks, trains, tractors and construction vehicles, since diesel engines generally utilize lesser amounts of fuel to generate power comparable to those of gasoline engines of equivalent size and weight. Particulate (e.g. soot) emissions from diesel engines can be relatively heavy, however, and accordingly devices such as soot traps and soot combustors have been designed to help capture and eliminate soot particulates.

In comparison with diesel engines and fuels, gasoline is typically more completely combusted during ordinary gasoline engine operation, with the primary polluting constituents of gasoline engine exhaust streams including volatile unburned hydrocarbons, carbon monoxide, and nitrogen oxides. However, fuel combustion is somewhat different in the case of gasoline direct injection (GDI) engines, as evidenced by the fact that the direct injection of the fuel into the combustion chambers of such engines can result in somewhat larger concentrations of unburned particulates in the engine exhaust stream.

Particulate emissions from sources such as gasoline-direct-injection engines can present a somewhat more difficult pollution control problem than diesel engine emissions. That is because the particulates generated during the operation of such engines predominantly fall in the sub-micrometer (e.g., nanometer) size range. Conventional diesel traps may not be well adapted for the capture and elimination of such particulates. For example, ceramic filters similar in configuration to current wall-flow diesel particulate filters (DPFs) may be made fine enough in porosity to capture nanometer-sized particles, but in that case may be so high in gas flow resistance as to raise engine exhaust back-pressures and reduce engine fuel efficiencies to objectionable levels. Other soot-handling systems, such as soot combustors and electrostatic precipitators designed to trap and/or combust soot particles of conventional size, are too inefficient or too costly and complex for widespread use in motor vehicles.

SUMMARY

In accordance with the present disclosure, carbonaceous particulate pollutants such as soot particles are removed from an engine exhaust stream by first passing the exhaust stream carrying suspended carbonaceous particles into a charging zone in an exhaust passageway within an engine exhaust gas reactor. A corona discharge is generated in the charging zone that is effective to produce at least some charged carbonaceous particles. The exhaust stream with charged carbonaceous particles is then conveyed from the charging zone into a collection zone downstream of the charging zone in the exhaust passageway. At least some of the charged particles in the exhaust stream are electrostatically attracted to an oppositely charged collecting surface within the collection zone, where they may collected and/or further processed for removal. The exhaust stream, exclusive of the particles deposited on the collecting surface, is then allowed to exit the exhaust passageway.

Methods such as above described may be effectively practiced utilizing apparatus incorporating exhaust gas reactors provided in accordance with the present disclosure. Embodiments of those reactors include an assembly incorporating at least one internal surface defining an exhaust passageway, the passageway having an upstream portion extending away from an exhaust inlet port and a downstream portion connecting with the upstream portion and terminating at an exhaust outlet port. Provided within that assembly is a charging section disposed in the upstream portion that includes a first electrode for generating a corona discharge, and a collection section within the downstream portion that includes a particulate collector having a charged collecting surface for collecting charged carbonaceous particles. Particular embodiments of the apparatus may include one or more sources of electrical potential connecting with the first electrode and with the charged collecting surface for electrically charging the electrode and collecting surface.

BRIEF DESCRIPTION OF THE DRAWINGS

Embodiments of apparatus for the practice of methods such as hereinafter disclosed are further described below with reference to the appended drawings, wherein.

DETAILED DESCRIPTION

Figure 1:
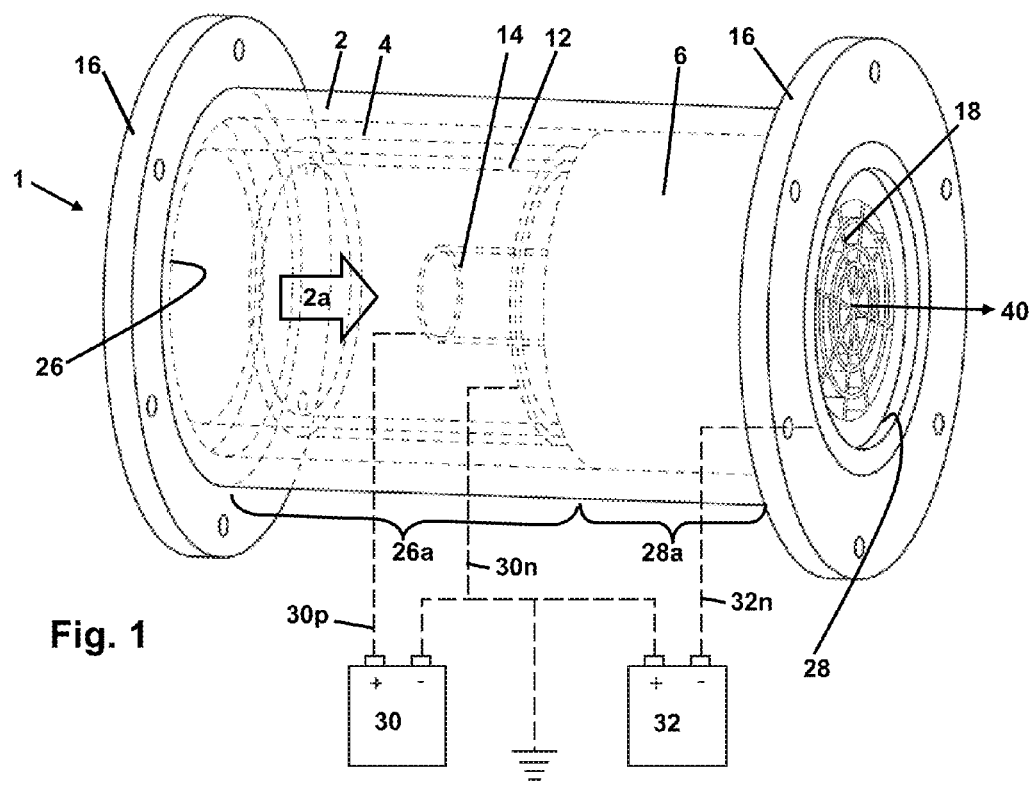
FIG. 1 is a schematic perspective cutaway view of one embodiment of an exhaust gas reactor provided in accordance with the disclosure.
Figure 2:
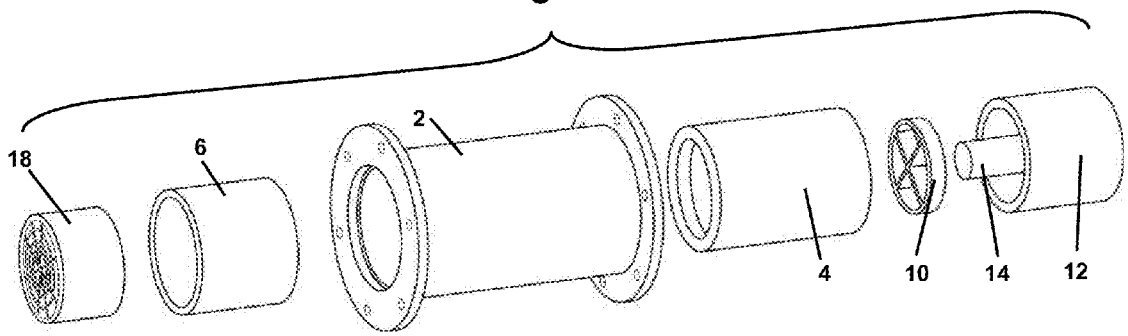
FIG. 2 is an exploded view of the reactor of FIG. 1.

An illustrative example of one embodiment of apparatus provided in accordance with the present disclosure is an exhaust gas reactor assembly schematically shown in FIGS. 1 and 2 of the drawings. As shown in those figures, the exhaust gas reactor 1 includes an outer enclosure 2 provided with connection flanges 16 to facilitate mounting the enclosure in a motor vehicle exhaust system (not shown). The enclosure is oriented in the engine exhaust system so that exhaust gases may enter the enclosure through an upstream exhaust inlet port 26 and exit the enclosure through a downstream exhaust outlet port 28 in the direction of exhaust flow arrow 40. Internal surface 2a of the enclosure defines an exhaust passageway including an upstream portion 26a originating at and extending away from inlet port 26, and a downstream portion 28a connected to the upstream portion and extending toward and terminating at exhaust outlet port 28.

Enclosure 2 houses a first or ionizing electrode 14 and a second or counter electrode 12 in upstream portion 26 of the apparatus, those components making up a charging section for the apparatus. The electrodes in the charging section generate a corona discharge for imparting an electrostatic charge to carbonaceous and other particulates passing through the enclosure. The enclosure further houses a collector/reactor 18 having a charged collecting surface in downstream portion 28a of the enclosure, those components constituting a collection section of the apparatus for electrostatically collecting charged particles from the exhaust stream. Collector/reactor 18 is formed of a material that can be electrically charged to an electrical potential effective to both attract and trap charged particles on collector/reactor surfaces.

Ionizing electrode 14 is suspended within enclosure 2 by ionizing electrode support 10. Insulators 4 and 6 are provided within enclosure 2 to insulate the charged components of the apparatus from enclosure 2 and flanges 16. Insulator 4 insulates counter electrode 12 as well as ionizing electrode 14 and its support 10 from contact with enclosure 2, while insulator 6 insulates collector/reactor 10 from electrical contact with that enclosure.

The apparatus further includes sources of electrical potential, connecting at least with ionizing electrode 14 and with the collecting surface of collector/reactor 18, for the purpose of electrically charging the electrode and collecting surface. As schematically shown in FIG. 1, those sources may include voltage generator 30 for charging ionizing electrode 14 via electric line 30$p$, and voltage generator 32 for oppositely charging collector/reactor 18 via electric line 32$n$. Second or counter electrode 12, which is mounted in opposition to ionizing electrode 14, is also connected to the voltage generators via electric line 30$n$, that line and counter electrode 12 being maintained at a neutral electrical potential via grounding.

As a consequence of the inclusion of insulators 4 and 6 in the apparatus embodiment shown in FIGS. 1 and 2, the charging section disposed within upstream portion 26$a$ of the apparatus is electrically isolated from the collection section disposed within downstream portion 28$a$ of the apparatus. Thus each of ionizing electrode 14 and collector/reactor 18 in the illustrated embodiment is independently charged to its appropriate electrical potential, with reference to a common or ground potential, utilizing the separate voltage generators 30 and 32.

Apparatus such as disclosed in FIGS. 1 and 2 supports particular embodiments of the above-described methods for treating engine exhaust wherein the step of passing the exhaust stream and charged carbonaceous particles from the charging zone into the collection zone is carried out while electrically isolating the collection zone from the charging zone. Such methods help to insure that collection of the charged particulates can be largely confined to downstream capture by the charged surfaces of collector/reactor 18, where the particles can be effectively converted to harmless by-products. Methods wherein substantially all of the suspended carbonaceous particles are transported through the charging zone without deposition on exhaust passageway surfaces within the charging zone are advantageous in that maintenance procedures for clearing unreacted particulates from the charging zone that can interfere with effective particle charging can be largely avoided.

Figure 3:
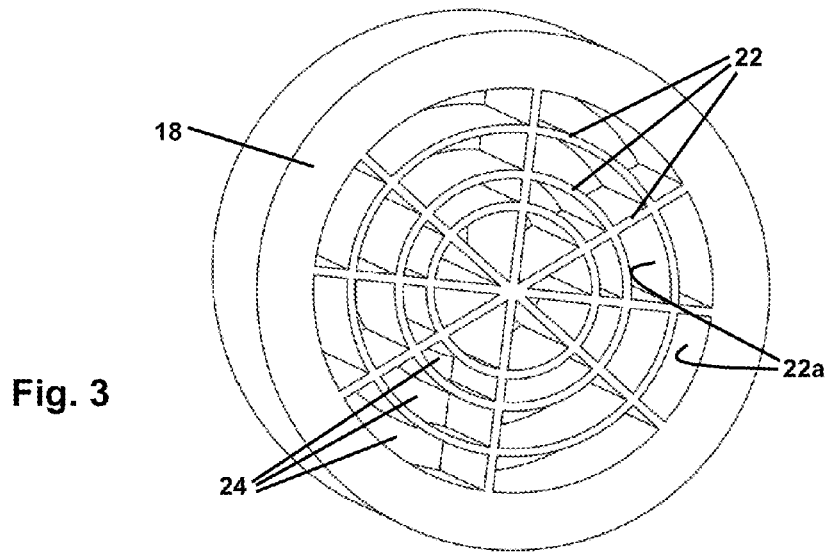
FIG. 3 is an enlarged schematic perspective view of a collector/reactor element useful in an exhaust gas reactor provided in accordance with the present disclosure.

An enlarged view of an embodiment of a collector/reactor 18 such as shown in FIGS. 1 and 2 of the drawings is schematically illustrated in FIG. 3 of the drawings. As shown in FIG. 3, the collector/reactor comprises a plurality of interconnecting walls 22 defining a plurality of mutually parallel channels 24, those channels extending in a direction generally parallel to the direction of exhaust gas flow 40 through the exhaust passageway defined by the reactor enclosure. Surfaces 22$a$ of walls 22 constitute the particle collection surfaces of the collector/reactor. Other collector/reactor designs offering a matrix of longitudinally extending transverse members that can provide useful collection surface area without unduly restricting exhaust gas flow through the matrix can alternatively be used.

Various materials can be employed to construct the collector/reactor, which in some embodiments has a structure comprising a metal, for example a structure comprising a metallized ceramic that can be adequately surface-charged for particle collection. These and other structural materials can readily support catalyst coatings, so that the charged collection surface will comprise a catalyst effective for converting the captured particulates to harmless by-products. Particular embodiments of catalyzed collector/reactors include those wherein the catalyst is active for the oxidation of carbonaceous particles deposited on the charged collecting surface in the presence of nitrogen oxides and/or water vapor. Catalysts having chemical compositions effective to promote one or more of reactions (1)-(6) below are examples of such catalysts:

$$C(s)+2H_2O(g)\rightarrow CO_2(g)+2H_2(g) \quad (1)$$

$$2C(s)+2H_2O(g)\rightarrow CO_2(g)+CH_4(g) \quad (2)$$

$$C(s)+H_2O(g)\rightarrow CO(g)+H_2(g) \quad (3)$$

$$C(s)+CO_2(g)\rightarrow 2CO(g) \quad (4)$$

$$2NO_2(g)+CH_4(g)\rightarrow N_2(g)+CO_2(g)+2H_2O(g) \quad (5)$$

$$2NO(g)+2CO(g)\rightarrow N_2(g)+2CO_2(g) \quad (6)$$

Methods for the operation of exhaust gas reactors such as illustrated in FIGS. 1-3 of the drawings are next described. In embodiments of those methods, an engine exhaust stream carrying suspended carbonaceous particles, which may be sub-micrometer-sized particles, is passed through inlet port 26 and conveyed through the exhaust passageway between ionizing electrode 14 and counter electrode 12 disposed in the upstream portion of enclosure 2 constituting the charging zone of the reactor assembly. As the exhaust stream passes though this zone, ionizing electrode 14 and its support 10 are maintained at an electrical potential sufficiently high to produce a corona discharge for imparting a positive electrical charge to at least some of the carbonaceous particulates present in the flowing exhaust stream. The carbonaceous particles thus pre-charged are then conveyed toward the downstream portion of enclosure 2 for deposition on the charged surfaces of collector/reactor 10.

During this stage, and throughout the period of reactor operation, enclosure 2 and flanges 16 as well as counter electrode 12 are maintained at a neutral or ground potential with respect to the exhaust stream and the electrically charged components of the system to minimize electrical shock risks. Insulator 4 has sufficient dielectric strength to prevent any flashover of high-voltage potential from electrode 14 to enclosure 2 as the exhaust stream with carbonaceous particles are passed through the charging zone and into the collection zone in the downstream portion of the reactor.

While the engine exhaust stream with pre-charged carbonaceous particles is passing through the collection zone in the downstream portion of enclosure 2, collector/reactor 18 is electrically charged to a polarity and potential effective to capture at least some of the particles present in the exhaust stream. Typically, the electrical potentials applied to ionizing electrode 14 are in the range of 1-10 kV, and those applied to the collector/reactor 18 are three to five times greater than those applied to the ionizing electrode.

To avoid any need for high-temperature soot combustion cycling of the reactor assembly for the purpose of oxidizing the trapped particles, embodiments of the disclosed methods are employed wherein at least some of the carbonaceous particles deposited on the surfaces of the collector/reactor are chemically reacted. For that purpose, the collecting surfaces 22a of collector/reactor 18 in the embodiment of FIGS. 1-3 of the drawings may include a catalyst.

The catalyst selected for inclusion on the collecting surfaces of collector/reactor 18 is one that is effective to promote the catalytic reaction and conversion of the carbonaceous particulates deposited on the surfaces of the collector to harmless by-products such as carbon dioxide and water. In those embodiments wherein the exhaust stream includes nitrogen oxides and water vapor, the catalyst is of a composition that will support reactions among the carbonaceous particles, nitrogen oxides and water vapor to produce diatomic nitrogen, carbon dioxide and water vapor. In some of those cases the temperature of the exhaust stream alone is sufficient to raise reactor and catalyst temperatures to levels supporting the conversion of nitrogen oxides to nitrogen.

Although not limited thereto, the use of the apparatus and methods hereinabove described is particularly effective for the treatment of exhaust streams from advanced gasoline engines such as direct injection gasoline engines. That is because such exhaust streams are more likely to include carbonaceous particles below one micrometer in size that are difficult to remove by other methods. For those applications in particular, methods and apparatus such as shown in FIGS. 1-3 of the drawings, wherein the engine exhaust stream is split into a plurality of sub-streams as it passes through collector/reactor 18, are especially advantageous because the trapping of sub-micrometer particulates from exhaust sub-streams of small cross-section is particularly efficient.

Although the collection of soot particles of nanometer size can be accomplished by passive means, i.e., simply by Brownian motion, surface collision and adhesion of the particles to a neutral surface, effective collection by passive approaches would require increasing the collision surface-area-to-free-volume ratio and increasing the residence time of the particles in the collection zone. The impracticality of such an approach is evident, and in fact limitations on the amount time available for particle collection from a fast-flowing exhaust stream in a collection zone of limited size places a premium on efficient capture surface design.

Conventional honeycomb structures of the kinds presently employed for the catalytic treatment of combustion engine exhaust system offer relatively high particle capture efficiency if the porosity and pore diameter of the channel wall material, and the open frontal area and channel hydraulic diameter, and the ratio of the channel diameter to the channel length of the structure are properly controlled. However, honeycomb structures optimized for passive particle capture are thought to exhibit sufficiently high exhaust gas flow resistance to objectionably raise exhaust back-pressures.

Electrostatic particle collection offers much higher particle trapping efficiency. Thus electrostatic capture enables the use of a broader range of collecting structures, including low-cell-density thin-walled honeycombs that can be of relatively high open frontal area and offer relatively low pressure drops and fuel consumption penalties. In some embodiments of the presently disclosed exhaust gas reactors, for example, particle collectors generally configured as shown in FIG. 3 of the drawings will have open frontal areas in excess of 50% of the collector cross-section, equivalent to having wall and support structure cross-sections making up less than 50% of the area of the total collector cross-section as measured in planes transverse to the direction of exhaust gas flow through the collectors.

Figure 4:
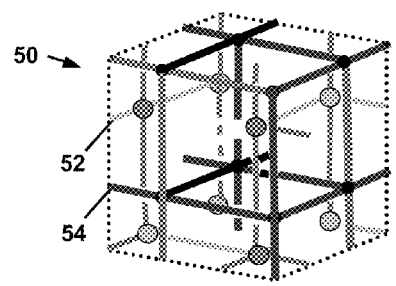
FIG. 4 is a schematic perspective view of a interpenetrating lattice electrostatic electrode structure.

Even lower solid cross-sections can be achieved, for example, in certain interpenetrating lattice structures. FIG. 4 of the drawings schematically illustrates a cubic interpenetrating lattice structure 50 of a type potentially useful for the electrostatic collection of sub-micrometer carbonaceous particles. Lattices of this complexity can be fashioned utilizing known rapid prototyping methods involving the successive deposition and subsequent consolidation of patterned layers of particulate feed material, the consolidated layers being built up until a unitary three-dimensional structure of complex solid geometry is developed.

In principle, interpenetrating lattice structures comprising an anode lattice 52 and a cathode lattice 54 as shown in FIG. 4 could provide a more uniform environment for the treatment of particle-laden exhaust gases than is possible in conventional electrostatic precipitators. A sufficiently durable lattice assembly could potentially support all three particle collection processes, i.e., particle charging, particle capture, and captured particle combustion, in the same volume.

Suitable design features for interpenetrating lattice structures like that shown in FIG. 4 include metal lattice segments of 1100° C. temperature capability, 7:1 length-to-diameter ratio and hexagonal segment cross-section for high strength. The orientation of the rapid prototyping build can suitable be with diagonally oriented lattice segments, and with a peripheral skin and possibly other cut-away structures on the perimeter, to provide a sufficient degree of structural support during construction.

In summary, embodiments of the present disclosure provide economical and efficient trapping and removal systems of relatively low size and weight that do not adversely affect motor vehicle fuel efficiency or unduly raise the cost and complexity of multifunctional vehicle anti-pollution systems. Embodiments of the disclosed methods include steps for disposing of trapped particulates via catalytic conversions to CO2 and H2O, rather than via filter exchanges or heat regeneration cycles. At the same time nitrogen oxides (NOx) can be converted to N2 and carbon monoxide (CO) to CO2, with these reactions being supported rather than impeded by water vapor present in the exhaust stream. Particular embodiments of the disclosed apparatus internally collect and store exhaust particulates during motor vehicle startup and until exhaust temperatures reach levels adequate to support the catalytic reactions of carbonaceous particle removal.

While the methods and apparatus of the present disclosure have been described above with reference to particular embodiments, it will be apparent from those descriptions that numerous variations in the design or arrangement of apparatus components and modifications of the procedures employed in the practice of the disclosed methods may adapted for particular purposes or applications within the scope of the appended claims.

What is claimed is:

1. A method of removing particles from an engine exhaust stream, the method comprising:
   passing an engine exhaust stream carrying suspended carbonaceous particles into a charging zone in an exhaust passageway;
   providing an assembly having at least one internal surface defining the exhaust passageway, the assembly including a first electrode least partially disposed in an upstream portion of the exhaust passageway forming the charging zone, and a particulate collector supporting the oppositely charged collecting surface at least partially disposed in a downstream portion of the exhaust passageway forming the collection zone;
   generating a corona discharge in the charging zone from the first electrode effective to produce at least some charged carbonaceous particles;

applying an electrical potential to the particulate collector that is sufficient to cause at least some of the charged carbonaceous particles to be deposited on the collecting surface;

passing the exhaust stream and charged carbonaceous particles from the charging zone into a collection zone downstream of the charging zone in the exhaust passageway;

electrostatically attracting at least some of the charged carbonaceous particles to an oppositely charged collecting surface within the collection zone; and allowing the exhaust stream exclusive of the particles deposited on the collecting surface to exit the exhaust passageway;

wherein the collecting surface comprises a catalyst, and wherein at least some of the particles deposited on the collecting surface are chemically reacted upon contact with the collecting surface.

2. The method of claim 1 wherein the particles deposited on the collecting surface are catalytically reacted to form carbon dioxide and water.

3. The method of claim 1 wherein the exhaust stream includes nitrogen oxides and water vapor, and wherein the catalyst supports reactions among the nitrogen oxides, the water vapor, and the carbonaceous particles.

4. The method of claim 1 wherein the temperature of the exhaust stream is sufficient to support catalytic reactions including reductions of nitrogen oxides to diatomic nitrogen.

5. The method of claim 1 wherein the exhaust stream is an exhaust stream from a direct injection gasoline engine, and wherein the carbonaceous particles include particles below 1 µm in size.

6. The method of claim 1 wherein the step of passing the exhaust stream and charged carbonaceous particles from the charging zone into the collection zone is carried out while electrically isolating the collection zone from the charging zone.

7. The method of claim 6 wherein substantially all of the suspended carbonaceous particles are transported through the charging zone without deposition on exhaust passageway surfaces within the charging zone.

8. The method of claim 1 wherein the exhaust stream is split into a plurality of sub-streams within the particulate collector.

9. An electrostatic exhaust particulate reactor comprising:
an assembly incorporating at least one internal surface defining an exhaust passageway, the passageway having an upstream portion extending away from an exhaust inlet port and a downstream portion connecting with the upstream portion and terminating at an exhaust outlet port;

a charging section within the upstream portion including a first electrode for generating a corona discharge;

a collection section within the downstream portion including a particulate collector/reactor having a charged collecting surface for collecting carbonaceous particles, wherein the charged collecting surface comprises a catalyst;

one or more sources of electrical potential connecting with the first electrode and with the charged collecting surface for electrically charging the electrode and collecting surface.

10. The reactor of claim 9 wherein the charging section further comprises a second electrode in opposition to the first electrode, the second electrode being maintained at a neutral electrical potential and the first electrode being maintained at an electrical potential sufficient to positively charge at least some carbonaceous particles transiting the charging section.

11. The reactor of claim 9 wherein the charging section is electrically isolated from the collection section.

12. The reactor of claim 9 wherein the catalyst is active for the oxidation of carbonaceous particles supported on the charged collecting surface in the presence of nitrogen oxides and/or water vapor.

13. The reactor of claim 9 wherein the particulate collector/reactor comprises a plurality of interconnecting walls supporting catalyst coatings and defining a plurality of mutually parallel channels extending in a direction generally parallel with the exhaust passageway.

14. The reactor of claim 13 wherein the particulate collector/reactor comprises a matrix comprised of longitudinally extending transverse members.

15. The reactor of claim 13 wherein the collector/reactor is comprised of metal.

16. The reactor of claim 13 wherein the collector/reactor is comprised of metallized ceramic.

17. The reactor of claim 13 wherein the catalyst has a composition effective to promote at least one reaction selected from the group consisting of the following reactions:

$C(s)+2H_2O(g) \rightarrow CO_2(g)+2H_2(g)$, $2C(s)+2H_2O(g) \rightarrow CO_2(g)+CH_4(g)$, $C(s)+H_2O(g) \rightarrow CO(g)+H_2(g)$, $C(s)+CO_2(g) \rightarrow 2CO(g)$, $2NO_2(g)+CH_4(g) \rightarrow N_2(g)+CO_2(g)+2H_2O(g)$, and $2NO(g)+2CO(g) \rightarrow N_2(g)+2CO_2(g)$.

* * * * *

UNITED STATES PATENT AND TRADEMARK OFFICE
CERTIFICATE OF CORRECTION

| | | |
|---|---|---|
| PATENT NO. | : 7,959,883 B2 | Page 1 of 1 |
| APPLICATION NO. | : 12/549630 | |
| DATED | : June 14, 2011 | |
| INVENTOR(S) | : Christopher William Drewnowski et al. | |

It is certified that error appears in the above-identified patent and that said Letters Patent is hereby corrected as shown below:

*Col.*     *Line*     should read 6        59       ing a first electrode at least partially disposed in an Signed and Sealed this
Twenty-seventh Day of March, 2012

David J. Kappos
*Director of the United States Patent and Trademark Office*